A. R. CHRISTMAN.
SHOCK ABSORBER.
APPLICATION FILED DEC. 28, 1915.

1,205,433.

Patented Nov. 21, 1916.

Witnesses
Wm. Conway
C. R. Ziegler

Inventor
Albert R. Christman,
By Joshua R. H. Potts.
his Attorney

UNITED STATES PATENT OFFICE.

ALBERT R. CHRISTMAN, OF PHILADELPHIA, PENNSYLVANIA, ASSIGNOR OF ONE-HALF TO JULIUS EISENBRAND, OF PHILADELPHIA, PENNSYLVANIA.

SHOCK-ABSORBER.

1,205,433.  Specification of Letters Patent.  Patented Nov. 21, 1916.

Application filed December 28, 1915. Serial No. 69,116.

*To all whom it may concern:*

Be it known that I, ALBERT R. CHRISTMAN, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide a piston movable in a cylinder and having by-pass ports therein with improved means controlling the ports so that the desired resistance is offered to the movement of the piston, and the adjustment permitted in accordance with the load.

A further object is to provide a piston with an improved arrangement of pivoted shutters which control certain by-pass ports in the piston, and provide an improved arrangement of valve which controls other by-pass ports in the piston, said valve adjusted by means on the outside of the shock absorber to permit the necessary adjustment in accordance with conditions.

A further object is to provide a shock absorber embodying in its construction the various novel elements which coöperate in the performance of an improved apparatus to absorb shocks and jars without detracting from the elasticity of the vehicle springs.

With these and other objects in view, the invention consists in certain novel features of construction and combinations and arrangements of parts as will be more fully hereinafter described and pointed out in the claims.

Figure 1:
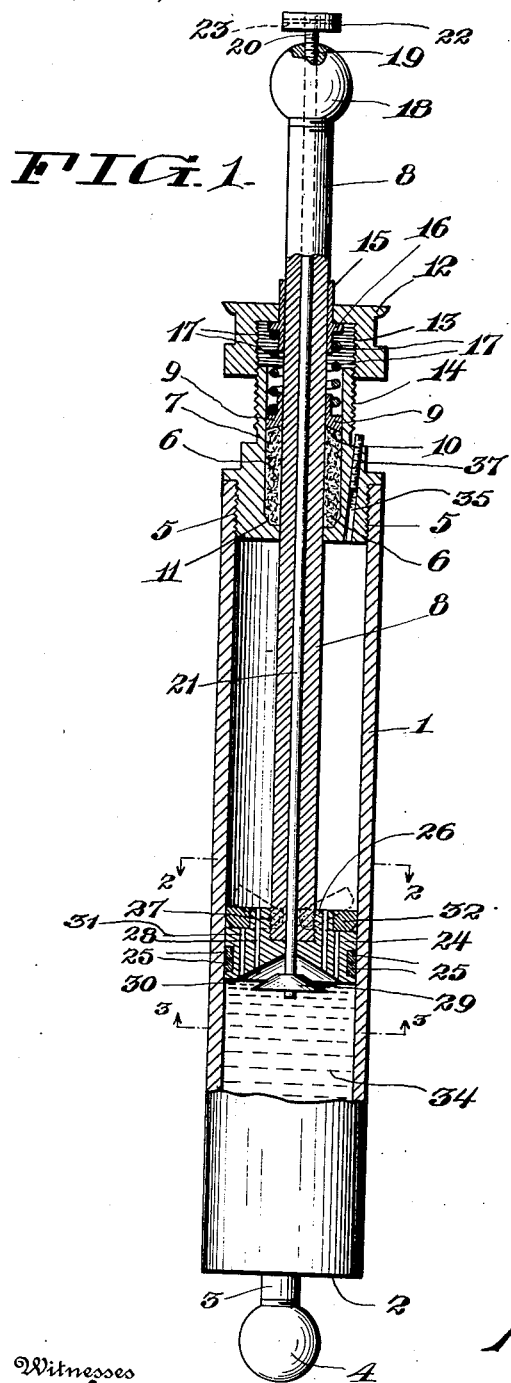
Figure 2:
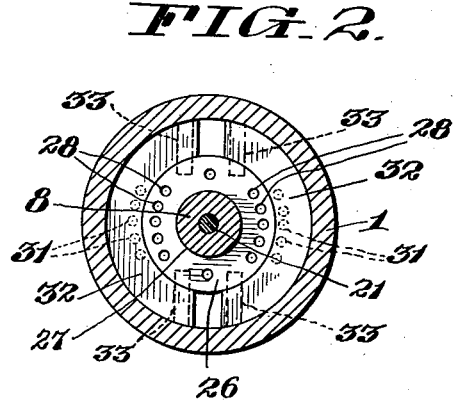
Figure 3:
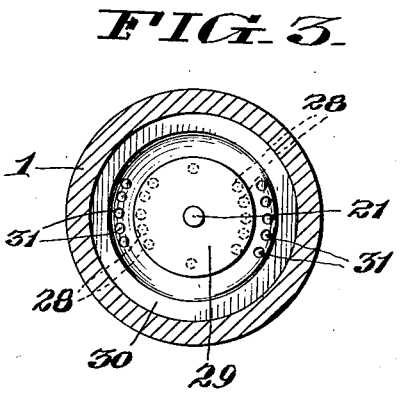

In the accompanying drawings: Figure 1 is a view in longitudinal section partly in elevation illustrating my improved shock absorber. Fig. 2 is an enlarged view in transverse section on the line 2—2 of Fig. 1, and Fig. 3 is a similar view in section on the line 3—3 of Fig. 1.

1 represents a cylinder having a closed end 2, the latter provided with a fixed rod 3 having a ball 4 on its end to be supported in a suitable mount (not shown). The upper end of cylinder 1 is internally screw-threaded as shown at 5 to receive the threaded lower end of a stuffing box 6. This stuffing box is provided with packing 7 located around a tubular rod 8 which extends through the stuffing box and is movable therein.

A movable gland 9 is located in the stuffing box, and the gland 9 and inner end of the stuffing box are made with beveled faces 10 and 11 respectively, so that when pressure is had upon the gland 9, the packing 7 will be pressed tightly around the tubular rod 8.

An adjusting ring 12 is internally screw-threaded as shown at 13, and engages external screw-threads 14 on the upper end of stuffing box 6. A sliding collar 15 projects through ring 12 and slides freely on the tube 8. This collar 15 is made with an annular flange 16 bearing against the inner face of ring 12, and also operating as a seat for one end of a coiled spring 17, the latter located around rod 8 and bearing at its opposite end against the gland 9, exerting a continued pressure on the gland. The tension of the spring can be varied by the adjustment of collar 12 on stuffing box 6 as will be well understood.

A ball 18 corresponding to ball 4 is screwed onto the upper end of rod 8, and this ball 18 is provided with a screw-threaded bore 19 in which the threaded upper end 20 of a rod 21 engages. In other words, the rod 20 is adjustable longitudinally by means of its threaded engagement with the bore 19 of ball 18, and is provided on its upper end with a button 22 secured to the rod by cross pin 23.

24 represents my improved piston which fits within cylinder 1, and is provided with suitable packing rings 25 to form a sliding yet tight juncture with the inner face of the casing. Piston 24 is made on its upper face with a circular extension 26, and this extension as well as the main portion of the piston is formed with a central screw-threaded recess 27 receiving the screw-threaded lower end of the tubular rod 8, and rigidly secured to the rod.

A plurality of by-pass ports 28 extend through the piston and through the extension 26, and these by-pass ports are controlled by a tapering valve 29 secured on the lower end of rod 21 and movable into and out of a conical recess 30 in the lower face of piston 24. In other words, the valve 29 operates to tightly close the ports 28 or to regulate the flow of fluid therethrough by reason of the distance said valve is spaced from the lower ends of the ports, and this regulation can be effected by turning the button 22 on the upper end of rod 21. Piston 24 is provided with other by-pass ports 31 which extend through the piston, and are located a distance from the center of the piston, so that they are not affected by the valve 29, but are controlled altogether by pivoted shutters 32. These shutters 32 are located on the upper face of the piston, are of general curved form as shown clearly in Fig. 2, and are pivotally connected to the extension 26 by pins 33 which are driven into the extensions as shown in dotted lines in Fig. 2.

In the lower portion of the cylinder 1, I locate a liquid 34 preferably a light oil containing graphite, while the upper portion of the cylinder contains air under ordinary atmospheric pressure.

In order that the fluid 34 may be located in the cylinder without removing the stuffing box, I provide an inlet 35 which extends through the stuffing box, and is normally closed by a screw-threaded plug 37.

In operation, the piston when at rest, or in normal position, is just submerged in the oil 34. When the piston moves downwardly, the fluid rushes upwardly through the ports 28 and 31, the shutters assuming the position shown in dotted lines in Fig. 1. When the piston moves upwardly, the shutters 32 close ports 31, and the fluid flows downwardly through ports 28. There is therefore an appreciably greater resistance to the upward movement of the piston than the downward movement thereof, and this difference may be varied by the adjustment of valve 29.

The shutters 32 as shown in Fig. 2 are curved and closely surround the extension 26. By having the shutters and extension as above described, the shutters can only move on their pivots a distance which is less than ninety degrees for the reason that after they have raised to the position shown in dotted lines in Fig. 1, they will engage the said extension 26, since the height of the extension and the closeness with which the shutters surround the extension, prevent them from moving entirely beyond the upper edge of the extension. This construction of the shutters and extension is a valuable feature of my invention because it keeps the movement of the shutters under control and prevents the noise which would occur if the shutters were freely pivoted and allowed to fly up and strike the tubular rod 8 when the piston descends in the casing.

When the valve 29 is in position to close the lower ends of the ports 28, the maximum resistance against upward movement of the piston is had, and during this movement there is a partial vacuum caused below the piston which greatly increases the resistance. With my improvements I am therefore enabled to adjust the valve 28, so that I can obtain any desired resistance to the upward movement of the piston which controls the rebound of the vehicle springs, and I can secure this adjustment after the shock absorber is in position on the vehicle.

I use the term "fluid" in the specification and in the claims to include not only the liquid in the bottom of the cylinder, but also the air in the top of the cylinder and any other liquid or gas that might be used for the purpose, as it is to be understood that the by-passing through the piston is controlled by the valve 29 and shutters 32 regardless of the specific gravity of the fluid.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a shock absorber, the combination with a cylinder, of a piston movable therein and having an extension and a series of by-pass ports, and shutters fitting closely and being pivoted to said extension for controlling said by-pass ports, the upward pivotal movement of said shutters being stopped by their engagement with the extension, substantially as described.

2. In a shock absorber, the combination with a cylinder, of a piston movable therein and having a circular extension, and a series of by-pass ports, and shutters pivoted on said extension for controlling said by-pass ports, said shutters each having a portion following the contour of said extension and designed to engage the piston and thereby limit their upward movement, substantially as described.

3. In a shock absorber, the combination with a cylinder, a tubular rod projecting into the cylinder, a piston secured on the tubular rod and having a conical recess in its face, said piston having by-pass ports extending through the piston and at one end communicating with said recess, a rod projecting through the tubular rod, and a tapering valve on the end of said last-mentioned rod movable in the recess in the piston and controlling the by-pass of fluid through the said ports, substantially as described.

4. In a shock absorber, the combination with a cylinder, a tubular rod projecting into the cylinder, a piston secured on the tubular rod and having a conical recess in its face, said piston having by-pass ports extending through the piston and at one end communicating with said recess, a rod projecting through the tubular rod, and a tapering valve on the end of said last-mentioned rod movable in the recess in the piston and controlling the by-pass of fluid through the said ports, other by-pass ports extending through the piston and not controlled by the said valve, and pivoted shutters on the piston controlling the last-mentioned ports, substantially as described.

5. In a shock absorber, the combination with a cylinder, a piston therein having an annular valve seat, and two sets of by-pass ports, the ports of one set being arranged in annular formation and opening into said valve seat, an adjustable valve designed to fit said valve seat and operated by means outside of the cylinder for regulting said latter set of by-pass ports, said second set of ports being located around said first set, and pivoted shutters on the piston controlling the other set of by-pass ports, substantially as described.

6. In a shock absorber, the combination with a cylinder, a piston therein having an annular valve seat and two sets of by-pass ports, the ports of one set being arranged in annular formation and opening into said valve seat, an adjustable valve designed to fit said valve seat and operated by means outside of the cylinder for regulating said latter set of by-pass ports, said second set of ports being located around said first set, and means for closing said second set of ports, substantially as described.

In testimony whereof I have signed my name to this specification in the presence of two subscribing witnesses.

ALBERT R. CHRISTMAN.

Witnesses:
  C. R. ZIEGLER,
  CHAS. E. POTTS.